US006818855B2

(12) United States Patent
Takeda et al.

(10) Patent No.: US 6,818,855 B2
(45) Date of Patent: Nov. 16, 2004

(54) LASER CUTTING APPARATUS

(75) Inventors: Minoru Takeda, Tokyo (JP); Motohiro Furuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/319,594

(22) Filed: Dec. 16, 2002

(65) Prior Publication Data

US 2003/0133402 A1 Jul. 17, 2003

Related U.S. Application Data

(62) Division of application No. 09/720,742, filed as application No. PCT/JP00/02708 on Apr. 25, 2000, now Pat. No. 6,512,735.

(30) Foreign Application Priority Data

Apr. 26, 1999 (JP) .......................................... 11-117706

(51) Int. Cl.[7] ............................................... B23K 26/00
(52) U.S. Cl. ............................... 219/121.6; 219/121.67
(58) Field of Search ......................... 219/121.6, 121.67, 219/121.72, 121.82, 121.83, 121.85

(56) References Cited

U.S. PATENT DOCUMENTS 4,896,313 A * 1/1990 Hirose et al. ............ 369/275.4
5,040,165 A * 8/1991 Taii et al. ................ 369/275.4
5,289,231 A * 2/1994 Magome et al. .............. 355/53
5,481,530 A * 1/1996 Ueda et al. .............. 369/275.1
5,972,459 A 10/1999 Kawakubo et al.
6,016,302 A 1/2000 Yamatsu et al.
6,054,199 A 4/2000 Sugiyama et al.
6,078,560 A 6/2000 Kashiwagi
6,118,756 A * 9/2000 Masuhara et al. ....... 369/275.4
6,175,548 B1 1/2001 Kashiwagi
6,214,528 B1 * 4/2001 Takeda et al. .............. 430/320
6,246,656 B1 6/2001 Kawakubo et al.

FOREIGN PATENT DOCUMENTS

EP 0874362 A2 10/1998

* cited by examiner

*Primary Examiner*—M. Alexandra Elve
(74) *Attorney, Agent, or Firm*—Sonnenschein, Nath & Rosenthal LLP

(57) ABSTRACT

There are provided an optical disk and a manufacturing method thereof which can increase its recording capacity, e.g. to 15 GB or higher. This optical disk may comprises an optical disk substrate 3 in which successive pits corresponding to a recording signal are formed, a reflection film 4 formed in this optical disk substrate 3 on its surface that successive pits 2 are formed and a light transmissive layer 5 formed on this reflection film 4. When a recorded signal is read out, i.e. reproduced from the optical disk, a signal recorded as successive pits is read out by irradiating of short-wavelength laser light having a wavelength of 350 nm to 420 nm from the side of the light transmissive layer 5 formed on the surface of the optical disk.

Moreover, in this optical disk, when the successive pits are observed from the side of the light transmissive layer irradiated by reproducing laser light, the successive pits contain pits having length and width ranging from 80 nm to 250 nm, and the reflection film has the film thickness selected to be 20 nm or less, e.g. greater than 8 nm.

24 Claims, 6 Drawing Sheets

39 60 19b 65 63 62 67 61 67b 37 67a 64 66

20
21
22
23
24
25
26
27
28
29
30
31
32
33
34
35
36
37
38
39
40
41
42
43
44
45
46
47
50
M1
M2
M3
M4

61
67
62
63
67b
65
66
67a
39
19b
64
60
37

LASER CUTTING APPARATUS

This application is a divisional application of U.S. application Ser. No. 09/720,742, filed Apr. 2, 2001 now U.S. Pat. No. 6,512,735, which is a National Stage entry of PCT/JP00/02708 filed Apr. 25, 2000, which claims priority from Japanese Patent Application No. 11/117706 filed Apr. 26, 1999, the contents of which are herein incorporated by reference to the extent allowed by law.

The present invention relates to an optical disk which can increase its recording density and a manufacturing method thereof.

BACKGROUND OF THE INVENTION

A conventional optical disk, e.g. DVD (Digital Versatile Disc) is formed such that, as its cross section is schematically shown in FIG. 6, a reflection film 102 having a thickness of several tens nanometers, e.g. thickness of 50 nm is formed on a light transmissive disk substrate 101 having a signal recording portion 100 on which successive pits are formed and a protection layer 103 made of an organic material having a thickness of, e.g. about 10 μm, covers the surface of the reflection film.

To read out a signal from this DVD, reproducing laser light 105 is irradiated on the signal recording portion through an objective lens 104 from the side of the light transmissive disk substrate 101, and pits in the signal recording portion 100, is detected i.e. recorded data is read out by returned light of the reproducing laser light.

In the case of ordinary DVD, since the disk substrate has a thickness of 0.6 mm and a signal is reproduced through this disk substrate 101, the numerical aperture N. A. of an objective lens that a reproducing pickup includes is restricted to about 0.6.

By the way, the size of a-spot of reproducing light is in proportion to a ratio λ/N. As between a wavelength (of the reproducing laser light 105 and an N. A. of the objective lens 104. In the conventional ordinary DVD, the wavelength of the reproducing light is 650 nm; the N. A. is 0.6; and one side of the disk has a recording capacity of 4.7 GB.

For example, consider an optical disk which is reproduced by reproducing laser light having a wavelength λ of 400 nm through an objective lens having a numerical aperture N. A. of 0.85. Then, the recording capacity of one side of this optical disk can simply be calculated to be 25 GB based on the proportion of this disk to the above-mentioned conventional DVD.

However, the recording capacity thus calculated is obtained in consideration of only the characteristics of the reproducing pickup. In actual practice, the pit size of the optical disk should also be made minute and made with high accuracy.

An ordinary optical disk manufacturing method is as follows. As shown in FIG. 7, on a glass disk 106 having a diameter of about 200 mm and a thickness of several millimeters and whose surface was precisely polished, there is formed a photoresist layer 107 having a film thickness of about 0.1 μm, in which a photoresist sufficiently sensitive to a wavelength of a recording laser light source 107 of a laser cutting apparatus is uniformly spin-coated.

This photoresist layer 107 is subjected to exposure. When this exposure is carried out, there is employed a pattern exposure in which laser light 109 having a wavelength of 413 nm from a recording laser light source 108 made of, e,g, a Kr laser, is on/off-modulated by an acousto-optic modulator, i.e. AOM 110 in response to a recording signal and focused to irradiate on the photoresist layer 107 through an expander 111 and an objective lens 112, making this laser light spot scan the photoresist layer 107 in a spiral fashion to form latent images of pits and grooves.

Thereafter, when this photoresist layer 107 is developed by an alkaline developer, the exposed portion is dissolved, and there is formed, as shown in FIG. 8, a master disk 121 in which an uneven pattern 120 comprising pits and grooves is formed on the photoresist layer 107 coated on the disk 106.

Then, on this uneven pattern 120 of this master disk 121, as shown in FIG. 8, there is deposited a metal layer 122 having a thickness of about 300 (m by sequentially effecting nonelectrolytic plating and electroplating of nickel (Ni) in such a manner as to fill this uneven pattern. Thereafter, this metal layer 122 is peeled from the master disk 121, and a stamper 123 having an inverted version of the uneven pattern 120 of the master disk 121 is obtained from the metal layer 122 thus peeled.

This stamper 123 is disposed within, e,g, an injection molding die for injection molding to produce the optical disk substrate 101 made of polycarbonate (PC) or the like, as shown in FIG. 9.

On this optical disk substrate 101, there are transferred uneven patterns of the stamper 123, i.e. there are formed pits and grooves corresponding to the uneven pattern of the master disk, thus causing the signal recording portion 100 shown in FIG. 6 to be formed.

In this optical disk substrate 101 on its surface that the signal recording portion 100 is formed, there is deposited, as shown in FIG. 9, the reflection film 102 shown in FIG. 6 by sputtering using aluminum (Al) target 124 for example. Further, the protection film 103 is formed on this reflection film.

This protection film 103 is generally made of a ultraviolet-curing resin cured by irradiating ultraviolet rays after the ultraviolet-curing resin is applied to the reflection film 102 by spin-coating so as to have a uniform thickness.

Since the limit of the numerical aperture of the objective lens 112 is generally about 0.9, the optical disk thus obtained after the master disk was produced by the pattern exposure effected by laser light having a wavelength of 413 nm will have successive pits formed thereon, which have the shortest pit length of 0.4 μm and the track pitch of 0.74 μm. In addition, the width of the pit, i.e. the length along the radial direction of the disk is about 0.35 μm which is half of the track pitch.

Due to such restrictions imposed upon the pit size when it is made minute and with high precision, the pit size cannot be made so minute and made with high such precision that an optical disk having a recording capacity of, e,g, 15 GB or more, in particular 25 GB can be obtained by the conventional pattern exposure using the laser light having the wavelength of 413 nm.

SUMMARY OF THE INVENTION

The present invention provides an optical disk and a method of manufacturing the same which can provide a high-density recording, i.e. which can provide the aforementioned recording capacity of, e.g. 15 GB or higher recording capacity of, e.g. 25 GB.

An optical disk according to the present invention may comprises an optical disk substrate in which successive pits corresponding to a recording signal are formed, a reflection film formed in this optical disk substrate on its surface that the successive pits are formed and a light transmissive layer formed on this reflection film.

When a recorded signal is read out, i.e. reproduced from this optical disk, a signal recorded as the successive pits is read out from the optical disk by irradiating short-wavelength laser light having a wavelength of 350 nm to 420 nm from the side of the light transmissive layer formed on the surface of the optical disk.

Moreover, when this optical disk is seen from the side of the light transmissive layer irradiated by reproducing laser light, the successive pits contain pits having length and width ranging from 80 nm to 250 nm, and the thickness of the reflection film is selected to be 20 nm or less, e.g. 8 nm greater.

The optical disk manufacturing method according to the present invention is the manufacturing method of producing the above described optical disk according to the present invention, comprising the steps of producing an optical disk manufacturing master disk for forming successive pits using laser light having a wavelength ranging from 200 nm to 370 nm for exposure in response to a recording signal, producing an optical disk substrate in which the successive pits containing pits having length and width both ranging from 80 nm to 250 nm are formed by transferring the successive pits of this master disk and forming a reflection film having a film thickness of 20 nm or less in this optical disk substrate an its surface that the successive pits are formed.

DETAILED DESCRIPTION OF THE PREFERRED EMBODIMENTS

Figure 1:
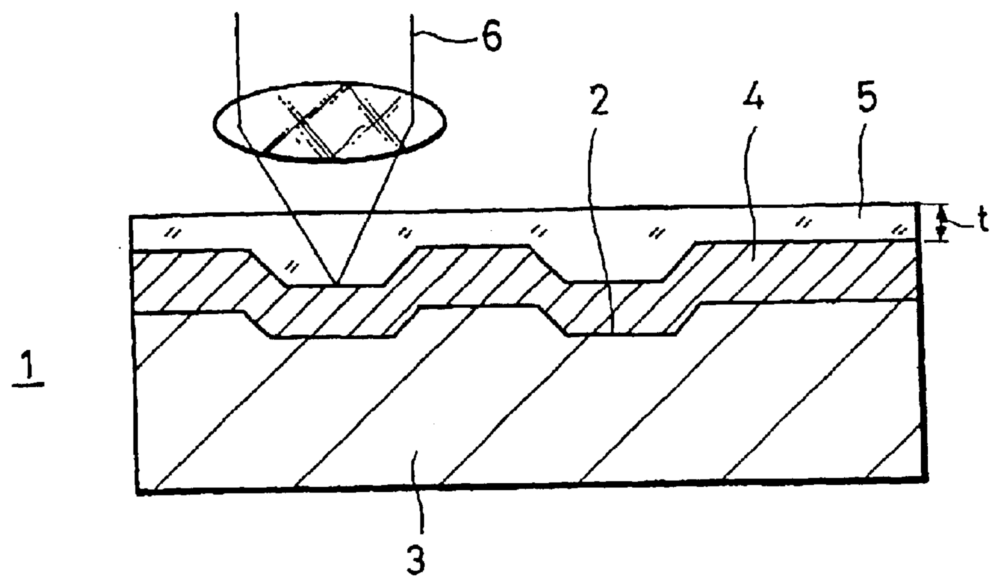
FIG. 1 is a schematic cross-sectional view of an example of an optical disk according to the present invention.

An optical disk 1 according to the present invention comprises, as a schematic cross-sectional view of its example is shown in FIG. 1, an optical disk substrate 3 having a thickness of 1.1 mm for example, in which successive pits containing pits 2 corresponding to a recording signal are formed, a reflection film 4 formed in this optical disk substrate 3 on its surface that the pits 2 are formed and a light transmissive layer 5 formed on this reflection film 4.

When a recorded signal is read out, i.e. reproduced from this optical disk 1, a signal recorded as the successive pits is read out from the optical disk by irradiating short-wavelength laser light having a wavelength of 350 nm to 420 nm from the side of the light transmissive layer 5 formed on the surface of the optical disk.

Moreover, when this optical disk is seen from the side of the light transmissive layer 5 irradiated by reproducing laser light, the successive pits contain the pits 2 having length and width ranging from 80 nm to 250 nm. The reflection film 4 is made of one or more kinds of materials of aluminum (Al), silver (Ag) and gold (Au) or two or more kinds of alloy materials of them. The thickness of the reflection film is selected to be 20 nm or less, and a reflectance of the reflection film is selected to be 15% or greater.

If a thickness t of the light transmissive layer 5 is selected between 10 μm to 177 μm, e.g. 100 μm (0.1 mm), then a pickup which uses as reproducing laser light short-wavelength laser light, e.g. violet laser light by a GaN-based laser having a short wavelength, e.g. a wavelength of 350 nm to 420 nm as and which also uses an objective lens having a high numerical aperture, e.g. 0.85 will be able to ensure an allowance of disk skew, i.e. a so-called skew margin.

In other words, according to the optical disk of the present invention, because the optical disk is arranged so that a signal is not read out by irradiating reproducing laser light from the side of the thick optical disk substrate having the thickness of 0.6 mm for example as in the past, but a signal is read out by irradiating reproducing laser light from the side of the light transmissive layer 5 having a considerably thin thickness of 0.1 mm for example, it is possible to use an objective lens having a numerical aperture of 0.85 for example, and a laser spot can be reduced in size, which in turn increases the recording density of an optical disk.

Unfortunately, if the pits are made minute as described above, then when the same reflection film is formed as in the ordinary conventional manner, a signal of good quality cannot be reproduced from an optical disk.

The reason for this is as follows. If an EFM (Eight to Fourteen Modulation) signal is recorded as successive pits having a shortest pit length of 220 mm and a track pitch of 410 nm and having about 15 GB, as the recording capacity in one side of the optical disk, then when a conventional Al reflection film having a thickness of about 30 nm is formed, the insides of the pits are filled with this reflection film by an amount corresponding to the thickness of this reflection film so that the pit size when the pits are seen from the side of the light transmissive layer 5 cannot be set at the above-mentioned target size.

Figure 2:
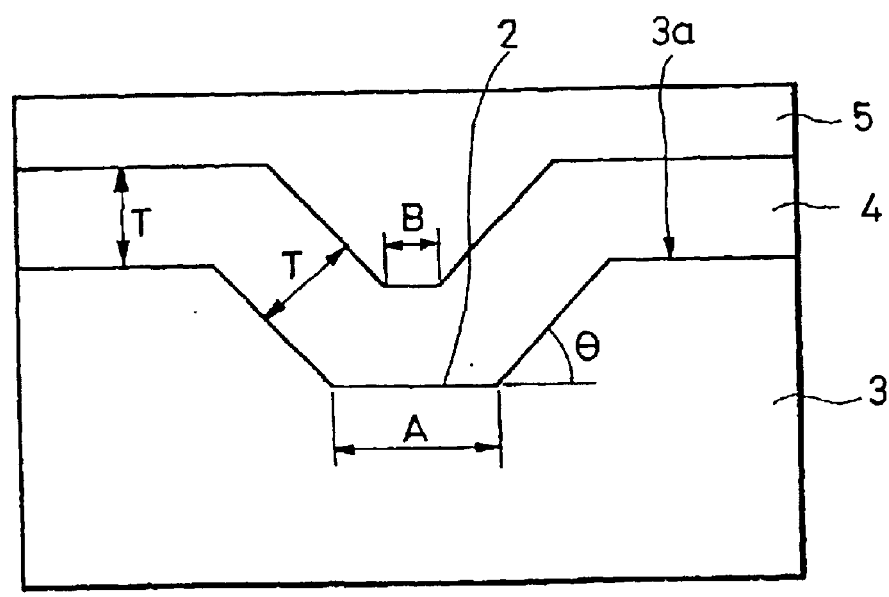
FIG. 2 is an enlarged cross-sectional view of pits of an optical disk according to the present invention.

As shown in FIG. 2, for example, if the reflection film 4 has a cross-section with a tapered angle θ relative to the major surface 3a of the optical disk substrate 3 on which the pit 2 is formed and this reflection film 4 having a uniform thickness T is formed on the wall surface, the bottom surface and the major surface of the pit 2 by sputtering, for example, then an effective length B of the pit when the pits are observed from the side of the light transmissive layer 5 irradiated by reproducing laser light after the reflection film was formed can be calculated based on the film thickness T of the reflection film 4 and the length A of the bottom surface of the pit as:

$$B=A-2\cdot T\cdot \tan(\theta/2)$$

The tapered angle θ generally falls within a range of approximately 40° to 80°. Moreover, the length A of the bottom surface of the pit is considerably small in the shortest pit due to the tapered angle θ. Thus, if the depth of the pit, for example, is assumed to be 90 nm and the tapered angle θ is assumed to be 60°, then the above-mentioned length will be about 120 nm in the track direction and about 100 nm in the radial direction of the disk.

Accordingly, if the reflection film has a film thickness of 30 nm and over, then the value of the effective pit size B will be 85 nm in the track direction and 65 nm in the radial direction of the disk. Thus, the value of the effective pit size will unavoidably decrease to approximately ⅓ of the above-mentioned proper pit size.

However, the longest pit having the length about 3.7 times as long as the shortest pit length can also cause a similar pit reduction effect. In this case, the reduction ratio of the pit length in the track direction will be about 75% relative to the proper pit length. If the pit length deviates from the proper size and the imbalance of the shortest and longest pit lengths occurs, then a reproduced signal is affected by such deviation and imbalance so that jitters will greatly increase.

In contrast, according to the above-mentioned optical disk of the present invention, the jitters can be prevented from increasing by making the thickness of the reflection film 4 equal to or less than 20 nm.

Thus, in the optical disk according to the present invention can avoid the disadvantage that the successive pits each pit being of very small size equal to or less than 250 nm are filled with the reflection film 4 and so the reproduced signal is deteriorated, when recorded data is reproduced from the optical disk by irradiating reproducing laser light from the side of the reflection film 4 formed on the signal pits.

Figure 3:
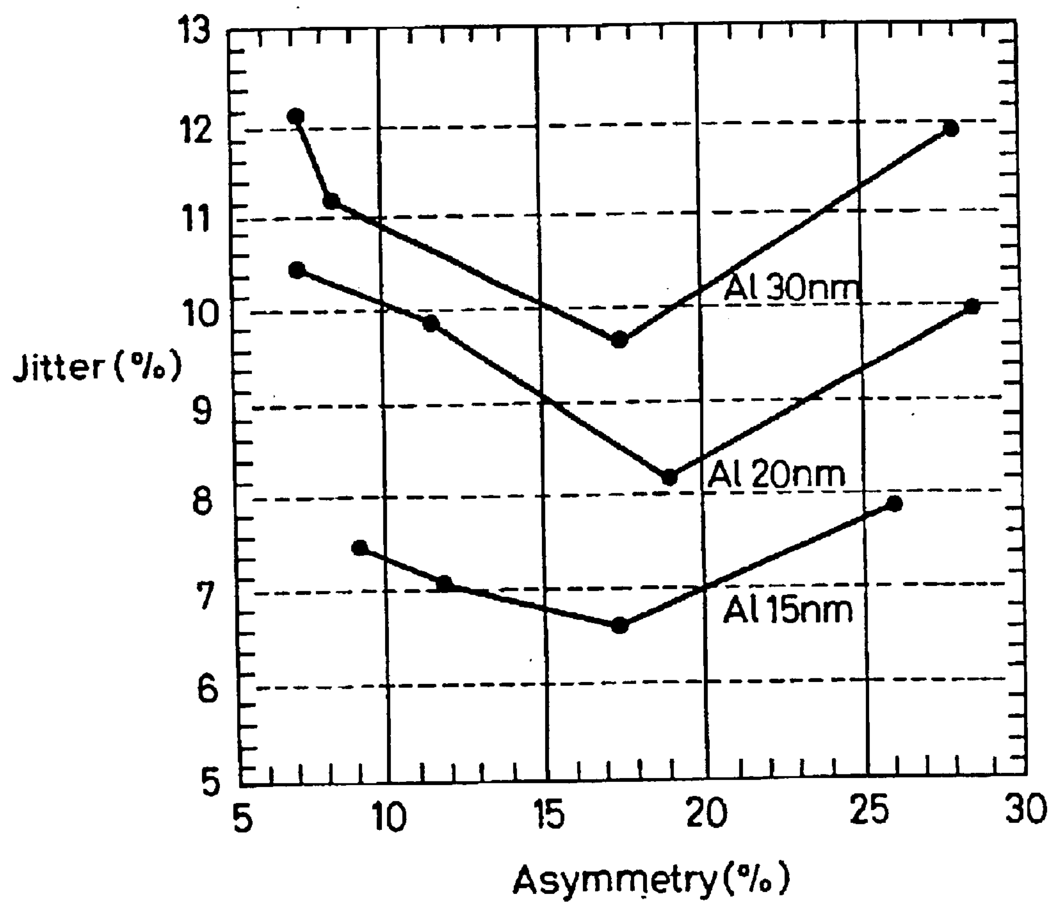
FIG. 3 is a diagram showing measured results of values of bottom jitter of a reproduced signal obtained when a film thickness of an Al reflection film is varied as a parameter.

FIG. 3 shows measured results of values of bottom jitter of a reproduced signal obtained when the thickness of the Al reflection film as parameter is varied to 15 nm, 20 nm and 30 nm respectively, using the optical disk in which the successive pits by the EFM signal equivalent to the actual recording density of 15 GB are formed.

In this case, the optical disk had such a structure that a signal is read out of the optical disk by irradiating laser light from the side of the light transmissive layer 5, and the film thickness of the light transmissive layer 5 was selected to be 100 (m. In this case, although the reproducing optical system used the wavelength of 532 nm, the N. A. was selected to be 0.94. Moreover, the horizontal axis in FIG. 3 represents the asymmetry of the reproduced signal, and the vertical axis thereof represents the value of jitter.

As is evident from FIG. 3, when the film thickness of the Al reflection film is 30 nm as in the prior-art optical disk, the value of the bottom jitter increases approximately up to 10%, which makes the quality of a signal unsatisfactory. However, when the film thickness is made 20 nm or less, the value of jitter becomes approximately 8%. When the film thickness is decreased down to 15 nm, a satisfactory value of jitter on a 6% level can be achieved.

However, if the film thickness is simply decreased progressively in order to prevent the shortest pit from being filled with the reflection film, then the reflectance of the optical disk substrate 3 is lowered with the result that the S/N of reproduced signal will deteriorate. From this point of view, the film thickness should preferably be selected to be 8 nm or greater.

The table 1 shows the dependence of the reflectance of reading laser light (wavelength is 407 nm) at the Al reflection film surface on the film thickness of the Al reflection film.

TABLE 1

| Film thickness (nm) of Al reflection film | 40 | 30 | 20 | 15 | 8 | 5 |
|---|---|---|---|---|---|---|
| Reflectance (%) | 88 | 82 | 67 | 43 | 15 | 8 |

From the above description, it can be seen that the optical disk having a high-recording capacity of 15 GB or greater in which the film thickness falls within the range of 8 nm to 20 nm and the reflectance is made 15% or greater is able to provide a reproduced signal of good quality.

Moreover, as described above, the reflection film 4 of the optical disk according to the present invention can be made of, in addition to Al which is widely utilized, metal materials which have a high reflectance at a thin film thickness, such as Au (gold) and Ag (silver), or alloy materials of two or more kinds of these metals, or metal (alloy) materials in which Ti (titanium) and the like is added to these respective materials.

Furthermore, the optical disk according to the present invention can be formed as the so-called data repeatedly recordable type of optical disk by arranging a signal recording film such as a phase-change film made of, e,g, GeSb, Te or the like, between the reflection film 4 and the light transmissive layer 5.

Further, the optical disk according to the present invention can be modified to as an optical disk having the so-called multilayer structure by forming two or more layers of both the reflection film 4 and the signal recording film, or two or more layers of only the signal recording film of the present invention.

For example, by laminating the signal recording films each having the successive pits through reflection films having a required reflectance, an optical disk can be formed, in which recorded signals are reproduced from the respective signal recording films by a suitable method such as focusing reproducing laser light on the respective signal recording films in reproduction.

A method of manufacturing an optical disk according to the present invention will be described next. This manufacturing method is to obtain the optical disk according to the present invention described above, including successive pits which contain pits having length and width both ranging from 80 nm to 250 nm.

In the optical disk manufacturing method according to the present invention, the optical disk is manufactured by the process of producing a master disk to manufacture an optical disk in which successive pits are formed by exposure corresponding to a recording signal using laser light having a wavelength ranging from 200 nm to 370 nm, producing an optical disk substrate having successive pits containing pits having length and width both ranging from 80 nm to 250 nm by transferring successive pits of this master disk and forming a reflection film having a film thickness of 20 nm or less in this optical disk substrate on its surface that the successive pits are formed.

The exposure process to produce the master disk in the manufacturing method according to the present invention, takes place using the so-called laser cutting apparatus. An example of this laser cutting apparatus will be described below with reference to a schematic diagram of FIG. 4.

Although this laser cutting apparatus uses short-wavelength recording laser light, its fundamental arrangement can be based on the ordinary conventional laser cutting apparatus.

This apparatus is provided with a recording laser light source 20 which can generate laser light having a wavelength of 266 nm for example. This recording laser light source 20 comprises a solid-state laser 21, a phase modulator 22, an external resonator 23 and an anamorphic optical system 24.

The solid-state laser 21 comprises a YAG (yttrium aluminum garnet) laser (wavelength is 1064 nm), for example, and an SHG (Secondary Harmonic Generator) for generating laser light having a wavelength of 532 nm by converting the laser light from the above-mentioned laser to that of double-wave. Then, laser light from this solid-state laser 21 is introduced through the phase modulator 22 to the external resonator 23. This external resonator 23 includes a wavelength converting optical crystal 25 made of, e,g, BBO ($\beta$-$BaB_2O_4$) crystal having a sufficiently high light transmissivity up to the far-ultraviolet ray region for further converting the above laser light into laser light of double-wave having a wavelength of 266 nm as well as an optical resonator forming a predetermined resonator length by mirrors $M_1$ to $M_4$, for example. As illustrated, the mirrors $M_1$ and $M_2$ are formed of mirrors having necessary reflectance and transmissivity. The mirrors $M_3$ and $M_4$ are formed of mirrors having a reflectance of, e,g, nearly 100%. Moreover, one mirror, e.g. mirror $M_3$ can be moved and adjusted by an electromagnetic actuator 26 having a so-called VCM (Voice Coil Motor) structure for example, thereby allowing the resonator length to be controlled. Then, light passing through the mirror $M_1$, for example, is detected from this resonator by a photodetector 27 such as a photodiode PD, and the actuator 26 is controlled by the output of this photodiode. Thus, servo-control is effected so as to provide an optimum resonator length, i.e. resonance wavelength, and laser light having a wavelength of 266 nm based on high output and stable continuous wave oscillation wavelength can be obtained. Then, laser light derived from the external resonator 26 is reshaped on its beam shape by the anamorphic optical system 24. In this manner, high-output and stable continuous oscillation laser light 50 of several tens of milliwatts having a wavelength of 266 nm can be derived from the recording laser light source 20.

Then, the laser light 50 obtained from this recording laser light source 20 is split by a beam splitter 28, for example. One part of the laser light is supplied to a photodetector 29 such as a photodiode, in which the power or the like of the laser light 50 is monitored.

The other part of the laser light, which is split by the beam splitter 28, is focused by a condenser lens 30 and then introduced into a modulator 31 such as the AOM where it is modulated in response to the recording signal. The laser light thus modulated is introduced through a collimator lens 32 and a beam splitter 33 into a beam expander 36 comprising lenses 34 and 35, and expanded by this beam expander 36 and introduced into an objective lens 37 as a beam spot of a diameter several times as large as its entrance pupil diameter. Reference numeral 40 denotes a mirror for directing the laser light from the beam expander 36 toward an objective lens 37.

The laser light thus converged by the objective lens 37 is irradiated on a resist disk 39, which is installed onto a turn table 38 by an air spindle rotating with high accuracy, for obtaining an optical disk manufacturing master disk.

This resist disk 39 rotates about the center axis as the turn table 38 rotates. This resist disk 39 has such a structure that a photoresist layer photosensitive to the wavelength of the laser light 50 is previously coated on a substrate forming the master disk, e.g. a glass disk.

Then, the laser light 50 which is turned on/off in response to the recording signal by the above-mentioned modulator 31, i.e. exposure laser light is irradiated on the photoresist layer of this resist disk 39 with a spot size of 0.3 $\mu$m or less.

On the other hand, the laser cutting apparatus is provided with a moving optical table 41 which is movable in the direction along the radial direction of the turn table 38. On this moving optical table, there is mounted, e.g. the beam expander 36 and an auto focus optical system to be described below although not shown.

In this manner, as this moving optical table 41 is moved and the turn table 38 is rotated, exposure laser light scans the photoresist layer of the resist disk 39 in a spiral fashion or an annular fashion for example.

On the other hand, a part of laser light which passes through the above-mentioned collimator lens 32, and is split by the beam splitter 33 is detected by a photodetector 42 such as a photodiode and thus the modulated laser light is monitored.

Returned light of exposure laser light from the disk 39 passes through the beam splitter 33 and extended optical path by mirrors 43, 44, 45 or the like for example and is converged by a condenser lens 46, thereby causing exposure laser light to be monitored, e.g. by a CCD (Charge Coupled Device) type of monitor camera 47 for monitoring exposure laser light.

Then, the objective lens 37 is arranged to constantly be focused on the photoresist layer of the resist disk 39 under the control of focusing servo.

Figure 5:
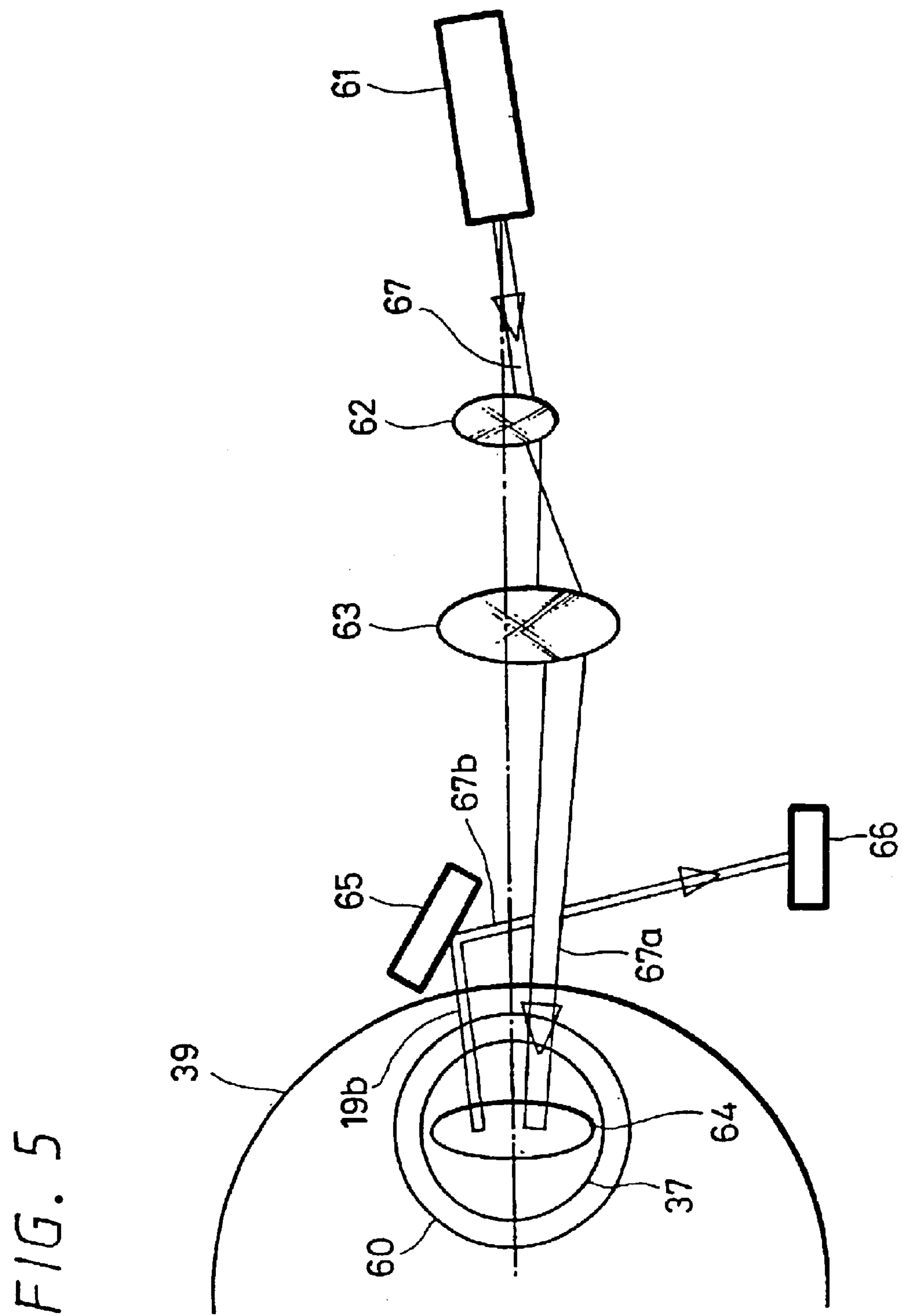
FIG. 5 is a diagram of optical paths showing an auto focus optical system of an example of a laser cutting apparatus.
Figure 6:
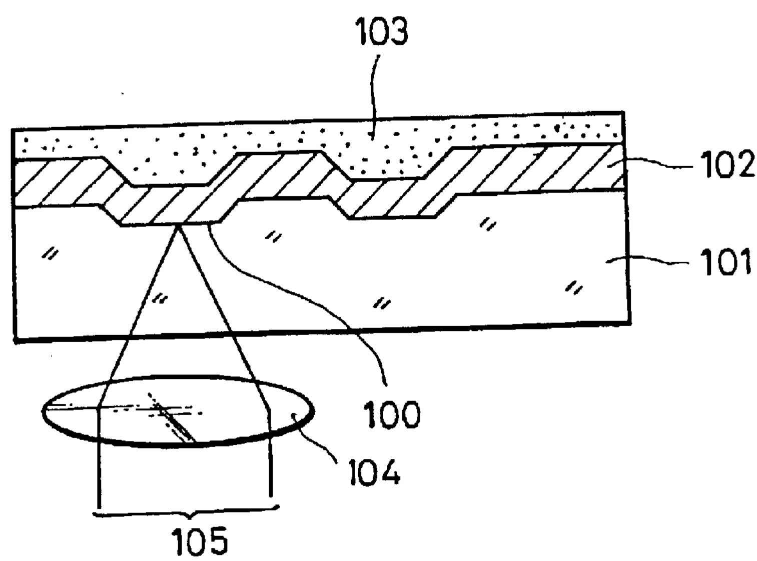
FIG. 6 is a cross-sectional view of an optical disk according to the prior art.
Figure 7:
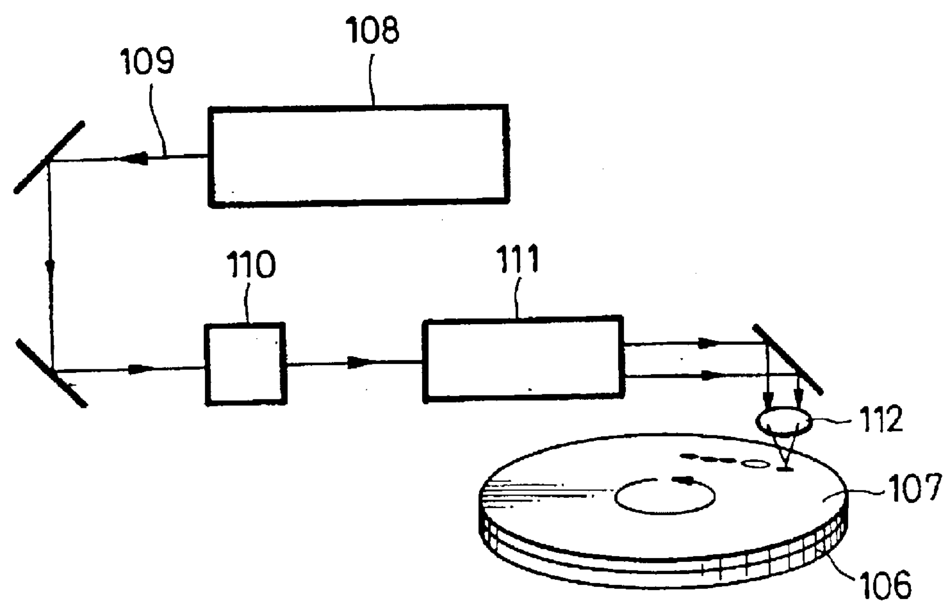
FIG. 7 is a diagram of arrangement of a laser cutting apparatus for producing a master disk to manufacture an optical disk according to the prior art.

An optical system of an auto focus servo means for executing this focusing is located on the aforementioned moving optical table 41. FIG. 5 shows a schematic arrangement of an example of the optical system of this auto focus servo means. The objective lens 37 is supported in such a manner that it may very slightly be moved in the optical axis direction by an actuator 60 having a VCM structure for example.

In this case, the optical system comprises an auto focus laser light source 61, optical lenses 62, 63, mirrors 64, 65 and a position detection device (PSD) 66.

The laser light source 61 can be comprised of a semiconductor laser having a wavelength of 680 nm, to which a high frequency superposition of a frequency 400 MHz and a pulse duty 50% is applied.

Laser light 67 from this laser light source 61 is made skewed relative to the optical axes of the optical systems of the lenses 62, 63 and irradiated on the resist disk 39 through the objective lens 37. Returned light of such laser light is detected by a position detection device (PSD) 66 through the mirror 65, and the actuator 60 is controlled by the detected output so as to move the objective lens 37 in its optical axis direction for focusing control.

Since the optical system of the focusing servo means thus arranged does not use a polarized beam splitter PBS and a polarized optical system such as a quarter-wave plate QWP or the like as in the conventional ordinary focusing servo, the above optical system is not limited by the numerical apertures of these optical elements and therefore the skew angle of the laser light incident on the objective lens 37 can be increased sufficiently. Specifically, a large opening angle can be formed between outgoing laser light 67*a* incident on the objective lens 37 from the laser light source 61 and returned light from the focusing surface of the resist disk 39 after passing through the objective lens 37, i.e. incoming laser light 67*b*, whereby the outgoing laser light 67*a* and the incoming laser light 67*b* can be separated from each other completely and the focusing state can be detected reliably by the position detection device 66, thus allowing a focusing servo signal to be obtained without fail.

By making the optical system, as it were, a non-polarized auto focus optical system, the skew angle of the laser light 67*a* incident on the objective lens 37 can be increased as much as possible, and the value of the height of laser light incidence on the objective lens can also be increased sufficiently. Accordingly, an optical gain expressed by an equation proportional to the above-described height of laser light incidence on the objective lens can also be increased remarkably as compared with the conventional auto focus optical system, which can largely contribute to improvements of the servo characteristics of the auto focus optical system.

Specifically, on the position detection device in the auto focus optical system, there exists, in addition to original exposure laser light to be detected, which has returned through the objective lens after being reflected on the surface of the exposure photoresist layer, slightly expanded laser light (hereinafter referred to as noise laser light) which has not reached the surface of the photoresist layer, but is reflected on the rear surface of the objective lens, i.e. on the surface of the opposite side of the surface of the objective lens facing the photoresist layer. This noise laser light exerts a bad influence upon the operation of the auto focus servo as a background noise component of the detected output of the position detection device.

Then, when this noise laser light interferes with original returned light, which should originally be detected, from the photoresist layer to cause interference fringes, the servo characteristics are greatly deteriorated and so the occurrence of such interference fringes has a serious effect. In general, since laser light upon which the high frequency is not superposed has a coherence length of several tens of centimeters, an optical path difference between returned light, which should originally be detected, from the photoresist layer and noise laser light caused by reflected light from the rear surface of the objective lens nearly falls within this range. Therefore, it is unavoidable that the interference fringes occur in the position detection device.

This interference fringes move frequency on the position detection device as the objective lens moves very slightly on the optical axis of the objective lens, thereby making the position detection signal of the original returned laser light inaccurate. In actual practice, if the auto focus servo is operated under the condition that the interference fringes occur, then the servo will oscillate frequently. As a result, it is difficult to maintain a normal auto focus operation.

In contrast, when the above-mentioned laser light source 61 upon which the high frequency of 400 MHz is superposed is used, because the coherence length is decreased sufficiently, it is possible to prevent the original returned (incoming) laser light 67*b* and the noise laser light caused by the reflected light from the rear surface of the objective lens from interfering with each other, thus enabling, the occurrence of the interference fringes to be avoided. In other words, because only the laser light 67*b* that should originally be detected is projected onto the position detection device 66, the spot position of cutting laser light relative to the photoresist layer can be detected with accuracy. Actually, in the case of the above-mentioned arrangement, it was confirmed that the auto focus servo hardly oscillates and so the normal auto focus servo operation can be maintained.

The laser cutting apparatus using the above auto focus optical system described with reference to FIG. 5 can realize the extremely stable and highly-accurate auto focus servo operation. Thus, this laser cutting apparatus can constantly and stably execute the cutting of the high-recording density optical disk with high productivity.

Therefore, it is possible to produce an optical disk manufacturing master disk for obtaining an optical disk substrate having successive pits with a recording density of 15 GB by this laser cutting apparatus.

An example of the method of producing this master disk using the above-mentioned laser cutting apparatus will be described below in detail.

Initially, there is prepared a glass disk which serves as a substrate to produce a master disk, having a diameter of about 200 nm and a thickness of several millimeters and whose surface is polished with high precision. There is then prepared the resist disk 39 in which the photoresist layer made by spin-coating the photoresist uniformly a in thickness of about 0.1 $\mu$m sensitive to laser light with a wavelength of far-ultraviolet ray region (wavelength: 266 nm) of the above-mentioned recording laser light 50 is formed on the surface polished with high precision.

Figure 4:
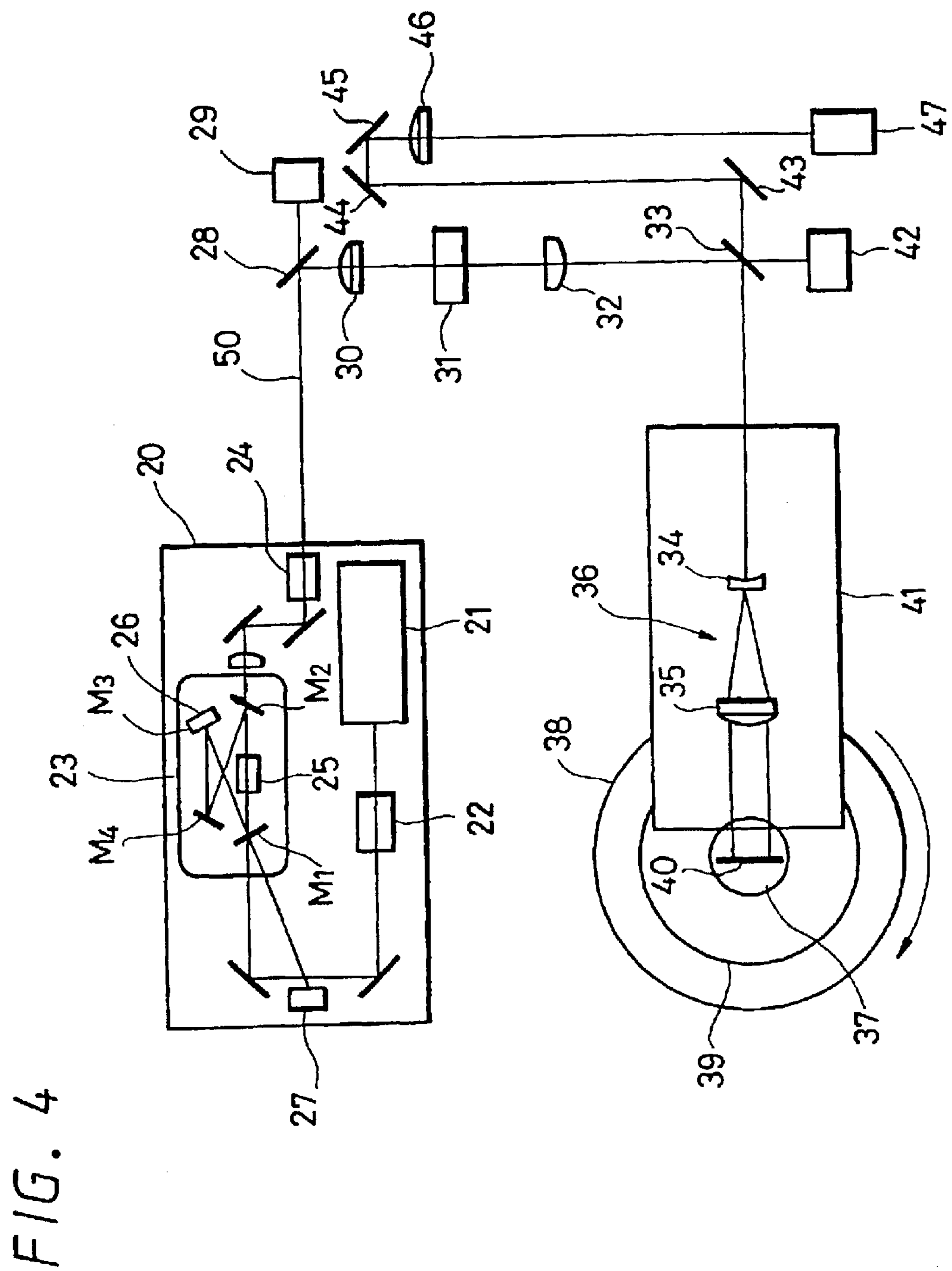
FIG. 4 is a diagram of arrangement of an example of a laser cutting apparatus.

Next, by the laser cutting apparatus described with reference to FIGS. 4 and 5, the recording laser light 50 is focused on the resist disk 39 by the objective lens 37 having a high N. A of about 0.9 as a spot of 0.3 $\mu$m or less in size. In this case, the laser light 50 scans the resist disk 39 in the spiral fashion or in the annular fashion as mentioned before while turning on/off the laser luminous flux in response to the recording signal by the AOM modulator 31 for example, thereby forming the latent images of the uneven pattern of the successive pits containing pits in which its length in the track direction and its width in the disk radial direction are both in the range of 80 nm to 250 nm (exposure process). The track pitch of the successive pits is selected between 150 nm and 450 nm.

If the resist disk 39 on which the latent images of the pits or the groove-like pattern are formed as described above is immersed in an alkaline developer and the exposed portion of the photoresist is dissolved, then the uneven patterns of the successive pits containing pits in which its length in the track direction and its width in the disk radial direction are both in the range of 80 nm to 250 nm can be obtained on the resist disk 39 (development process).

In this way, there is produced the optical disk manufacturing master disk on which the uneven pattern in accordance with the pattern of the photoresist layer is formed.

Figure 8:
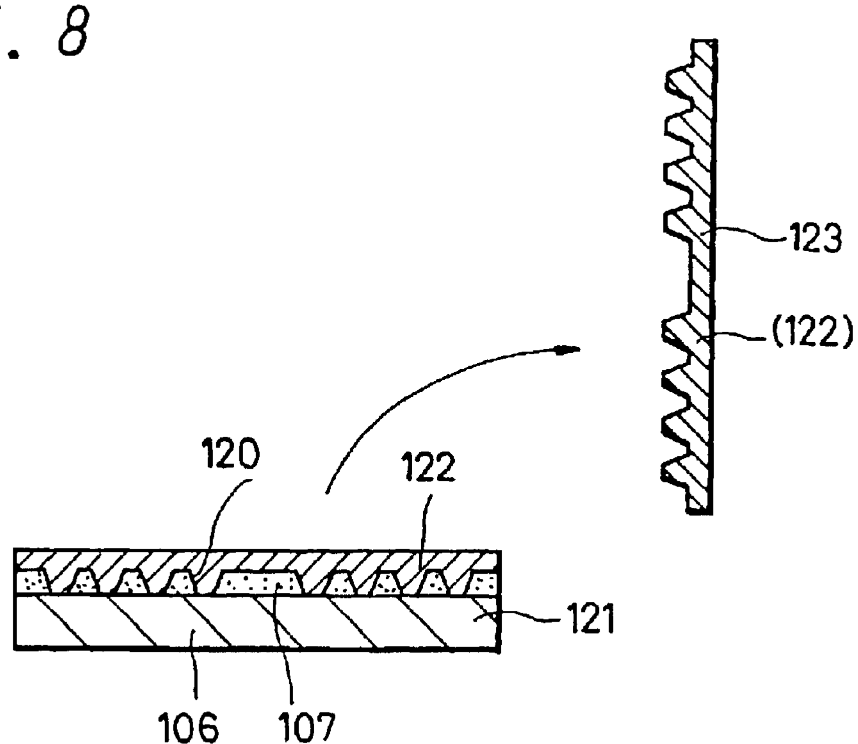
FIG. 8 is a diagram for explaining the manner in which a stamper is produced from the optical disk manufacturing master disk.
Figure 9:
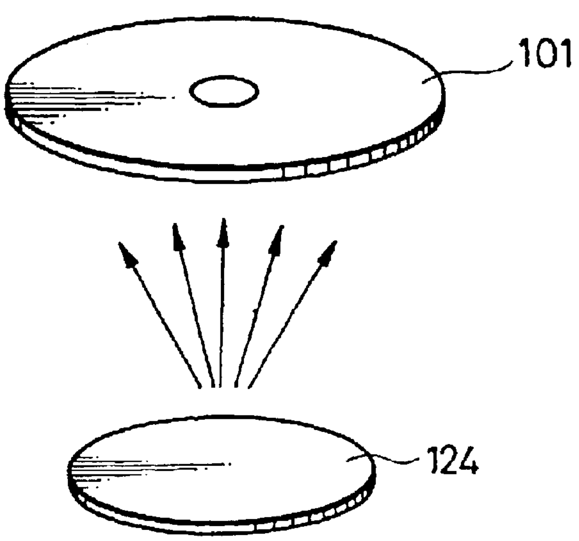
FIG. 9 is diagram for explaining a method of manufacturing an optical disk.

Then, an Ni (nickel) thin film having a film thickness of several hundreds angstroms is deposited on this master disk by sputtering or nonelectrolytic plating. The metal layer is then formed on this thin film serving as a conductive film in electroplating, and this metal layer is peeled in the same way as described with reference to FIG. 8, thus making in an Ni stamper having a thickness of about 300 $\mu$m to be produced. The rear surface of this Ni stamper is then polished and the end face thereof is worked (stamper manufacturing process).

Next, this Ni stamper is disposed within a molding die and the injection molding of, e.g. polycarbonate (PC) or the like is performed. Thus, the optical disk substrate 3 having the diameter of 120 mm for example, made of a plastic material shown in FIG. 1 is produced as a replica of the Ni stamper.

Onto the signal recording portion of the optical disk substrate 3 thus produced, there is transferred the uneven pattern based on the successive pits and grooves recorded by the above-mentioned cutting and containing the pits in which its length in the track direction and its width in the disk radial direction both fall within the range of 80 nm to 250 nm (transfer process).

Subsequently, by the sputtering apparatus, an Al reflection film 4 having a film thickness of 20 nm or less, e.g. 15 nm is formed on the surface of the signal recording portion side where the pits or the groove-like pattern of the optical disk substrate 3 are formed (reflection film forming process).

Further, on this metal reflection film 4, there is cured and formed the light transmissive layer 5 having the thickness of about 0.1 mm by spin-coating of ultraviolet-curing resin and irradiation of ultraviolet rays (light transmissive layer forming process). In this manner, there is finished the optical disk 1 according to the present invention shown in FIG. 1.

It is desirable that the spot diameter of the reproducing laser light 6 of the high-recording density optical disk 3 according to the present invention manufactured by the above-mentioned manufacturing method according to the present invention is selected in the range of 200 nm to 500 nm.

Incidentally, concrete shapes and structures of the respective portions shown in the above-mentioned embodiment illustrate only an example of modes for carrying out the invention. It will be appreciated that the technical scope of the present invention should not be limitedly interpreted from these concrete shapes and structures.

As described above, the optical disk according to the present invention comprises the optical disk substrate in which the successive pits corresponding to the recording signal are formed, the reflection film formed in the optical disk substrate on its surface that the successive pits are formed and the light transmissive layer formed on the reflection film, wherein the signal recorded as the successive pits is read out of the optical disk by irradiating the laser light from the side of the light transmissive layer. When the successive pits are observed from the side of the transmissive layer, the successive pits contain the pits having length and width both ranging from 80 nm to 250 nm and the film thickness of the reflection film is selected to be 20 nm or less. Thus, even when the successive pits of very small size 250 nm or less are cut, the pits can be prevented from being filled with the reflection film so that the reproduced signal will not deteriorate. Therefore, it is possible to obtain the high-recording density optical disk of excellent quality.

Moreover, since the reflection film is made of one or more kinds of materials of aluminum, silver, gold or alloy materials containing these materials, by using an optimum material as the material of the reflection film for reflecting the laser light, it is possible to obtain the satisfactory reflection characteristics as the reflection film of the high-recording density optical disk.

Furthermore, since the reflectance of the reflection film is selected to be 15% or greater, it is possible to reliably read out recorded information from the successive pits.

Moreover, in the optical disk manufacturing method for manufacturing the optical disk by transferring the successive pits formed on the master disk by exposure in response to the recording signal onto the optical disk substrate, because the optical disk manufacturing method according to the present invention comprises the steps of exposing by the laser light having the wavelength of 200 nm or more, to form the successive pits containing the pits having length and width both ranging from 80 nm to 250 nm transferring the successive pits formed on the master disk onto the optical disk substrate and forming the reflection film having the film thickness of 20 nm or less in the optical disk substrate on its surface that the successive pits are transferred, even when the successive pits of very small size less than 250 nm or less are cut, the pits can be prevented from being filled with the reflection film so that the reproduced signal will not deteriorate. Thus, it is possible to manufacture the high-recording density optical disk of good quality.

Moreover, since the reflection film is made of one or more kinds of materials of aluminum, silver, gold or alloy materials containing these materials and the optimum material can be used as the material of the reflection film for reflecting the laser light, it is possible to manufacture the high-recording density optical disk in which the reflection film has the satisfactory reflection characteristics.

Furthermore, since the reflectance of the reflection film is selected to be of 15% or higher, it is possible to manufacture the high-recording density optical disk in which the recorded information can be reliably read out from the successive pits.

What is claimed is:

1. A laser cutting apparatus for producing a master disk, the master disk being formed of a substrate having a photoresist layer coated thereon forming a resist disk, the laser cutting apparatus comprising:

a laser light source which generates laser light of a short-wavelength, wherein said laser light source comprises:

a solid state laser which generates said laser light;

a phase modulator which modulates said generated laser light;

an external resonator which converts said modulated laser light; and an anamorphic optical system which reshapes said laser light emitted from said external resonator; and an auto focus servo mechanism which controls said laser light to focus said laser light on the photoresist layer of the resist disk, the photoresist layer which is photosensitive to said short-wavelength laser light.

2. The laser cutting apparatus according to claim 1, wherein said solid state laser comprises:

a YAG laser; and a Secondary Harmonic Generator which converts said laser light to that of a double wave.

3. The laser cutting apparatus according to claim 2, wherein said laser light generated by said solid state laser has a wavelength of 532 nm.

4. The laser cutting apparatus according to claim 1, wherein said external resonator comprises:

a wavelength converting optical crystal which converts said modulated laser light from said phase modulator into laser light of double-wave; and an optical resonator which forms a predetermined resonator length by a plurality of mirrors having a predetermined reflectance and transmissivity.

5. The laser cutting apparatus according to claim 4, wherein said laser light of double-wave has a wavelength of 268 nm.

6. The laser cutting apparatus according to claim 4, wherein said optical crystal is a BBO crystal having a predetermined transmissivity.

7. The laser cutting apparatus according to claim 4, wherein said plurality of mirrors has a reflectance approaching 100%.

8. The laser cutting apparatus according to claim 4, wherein said external resonator further comprises:

a first electromagnetic actuator having a Voice Coil Motor, said first actuator which controls one of said plurality of mirrors, thereby controlling said predetermined resonator length.

9. The laser cutting apparatus according to claim 8, wherein said laser light source further comprises:

a first photodetector;

wherein an output of said photodetector controls said first actuator to achieve said predetermined resonator length.

10. The laser cutting apparatus according to claim 1, further comprising:

a first beam splitter; and a second photodetector;

wherein said first beam splitter splits one portion of said laser light from said laser light source and sends said laser light to a second photodetector which monitors at least a power of said laser light from said laser light source.

11. The laser cutting apparatus according to claim 10, further comprising:

a condenser lens which focuses another portion of said laser light split from said first beam splitter; and a modulator which modulates said laser light from said condenser lens in response to a recording signal.

12. The laser cutting apparatus according to claim 11, further comprising:

a collimator lens which collimates said modulated laser light;

a beam expanding mechanism;

a third photodetector; and a second beam splitter which splits said collimated laser light into one portion which enters said beam expanding mechanism, and another portion which enters said third photodetector where said collimated laser light is monitored.

13. The laser cutting apparatus according to claim 12, wherein said laser cutting apparatus further comprises:

a moving optical table on which said beam expanding mechanism and said auto focus mechanism are mounted; and a turn table on which the resist disk is installed by a rotating air spindle;

wherein said moving optical table is movable in a direction along a radial direction of said turn table.

14. The laser cutting apparatus according to claim 13, wherein said beam expander comprises a plurality of lenses through which a beam of laser light is expanded.

15. The laser cutting apparatus according to claim 14, further comprising:

a mirror; and an objective lens; and a second actuator having a Voice Coil Motor structure, said second actuator which moves said objective lens in an optical axis direction.

16. The laser cutting apparatus according to claim 15, wherein said expanded beam of laser light from said plurality of lenses of said beam expander is directed by said mirror to said objective lens as a beam spot of a diameter larger than an entrance pupil diameter; and wherein the resist disk receives said laser light from said laser light source via said objective lens.

17. The laser cutting apparatus according to claim 1, wherein said auto focus servo mechanism comprises:

an auto focus laser tight source;

a plurality of optical lenses;

a plurality of mirrors; and a position detection device.

18. The laser cutting apparatus according to claim 17, wherein said auto focus laser light source is a semiconductor laser.

19. The laser cutting apparatus according to claim 18, wherein said semiconductor laser has a wavelength of 680 nm, to which a high frequency superposition of a frequency 400 MHz and a pulse duty 50% is applied.

20. The laser cutting apparatus according to claim 19, further comprising:

a mirror; and an objective lens; and a actuator having a Voice Coil Motor structure, sold actuator which moves said objective lens in an optical axis direction.

21. The laser cutting apparatus according to claim 20, wherein laser light from said auto focus laser light source is made skewed relative to optical axes of said plurality of optical lenses and irradiates the resist disk through said objective lens.

22. The laser cutting apparatus according to claim 21, wherein said position detection device detects returned laser light from the resist disk through said mirror, and said detected output controls said actuator so as to move said objective lens in its optical axis direction for focusing control.

23. The laser cutting apparatus according to claim 22, wherein said auto focus mechanism separates said laser light incident on said objective lens from said auto focus laser light source and said returned laser light from a focusing surface of the resist disk after passing through said objective lens, forming an opening angle, and allowing said position detector device to detect a focusing state.

24. The laser cutting apparatus according to claim 11, further comprising a camera for monitoring exposure of said laser light from said condenser lens.

* * * * *